Figure 1:
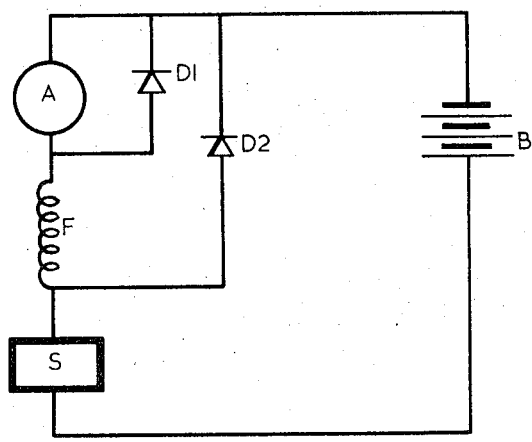

United States Patent [19]
Morton et al.

[11] 3,826,962
[45] July 30, 1974

[54] CONTROL OF ELECTRIC MOTORS FOR BATTERY-OPERATED VEHICLES

[75] Inventors: John Morton, Hazel Grove; Keith Drummond Stevens, Marple; Graham Spencer Thexton, Marple Bridge, all of England

[73] Assignee: Cableform Limited, Cheshire, England

[22] Filed: May 30, 1973

[21] Appl. No.: 365,149

[30] Foreign Application Priority Data
June 8, 1972  Great Britain............... 26669/72

[52] U.S. Cl. ............................................. 318/376
[51] Int. Cl. ............................................ H02p 3/12
[58] Field of Search ........... 318/139, 246, 249, 257, 318/258, 261, 268, 269, 273, 274, 341, 376, 379, 380, 375

[56] References Cited
UNITED STATES PATENTS

| | | | |
|---|---|---|---|
| 3,297,931 | 1/1967 | Gurwicz.......................... | 328/376 X |
| 3,325,714 | 6/1967 | Torii .............................. | 318/376 X |
| 3,656,039 | 4/1972 | Konrad .......................... | 318/376 X |

Primary Examiner—Robert K. Schaefer
Assistant Examiner—W. E. Duncanson, Jr.
Attorney, Agent, or Firm—Holman & Stern

[57] ABSTRACT

A control means for a series electric motor for, for example, battery operated vehicle usually includes a DC switch for connecting said motor across a battery, a flywheel diode for connecting across the motor and a reverse diode for conducting armature current resulting from regeneration. To avoid overheating when regeneration braking is used on long gradients a resistor is provided in the armature reverse-diode loop in combination with a contactor having a current coil sensitive only to reverse diode current and having normally closed contacts shorting the resistor.

5 Claims, 2 Drawing Figures

PATENTED JUL 30 1974　　3,826,962

3,826,962

CONTROL OF ELECTRIC MOTORS FOR BATTERY-OPERATED VEHICLES

This invention relates to the control of electric motors for use as traction motors in battery operated vehicles. The current to such motors is usually supplied in pulses controlled by a D.C. switch connected between the motor and a battery. The D.C. switch usually comprises a thyristor arrangement controlled by a pulse generator responsive to a control device, such as an accelerator pedal, under the control of the vehicle operator so that the energy supplied to the motor is varied by varying the frequency and/or mark space ratio of the pulses of current. Generally a series motor is used and a reverse diode is connected across the armature to enable braking to take place by reversing the field current, the armature current resulting from regeneration being taken by through the diode. The kinetic energy is dissipated as heat in the armature and whereas this is quite satisfactory for a stopping brake, it is not satisfactory for a holding brake for restraining a vehicle on a long gradient.

An object of the invention is to provide an improved control means which enables sustained braking to be accommodated.

According to the invention, a control means for a series motor includes the provision of a resistor in series in the armature diode loop in combination with a contactor having a current coil sensitive only to diode current and having normally closed contacts shorting the resistor. Thus the resistor is shorted out except when the current through the diode is sufficient to operate the contactor, i.e. during regenerative braking.

Figure 2:
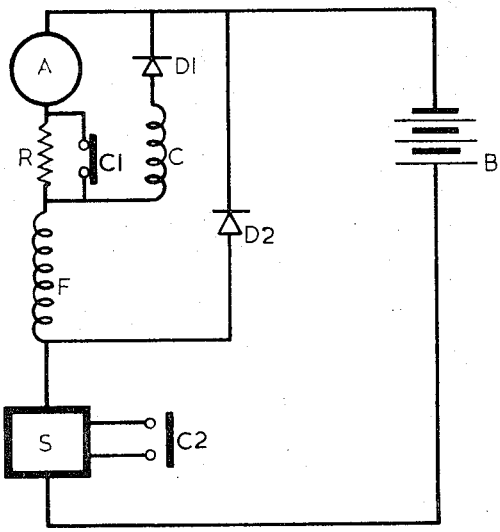

An embodiment of the invention will now be described with reference by way of example to the accompanying drawing, in which:

FIG. 1 is a schematic circuit diagram of a known arrangement, the drawing being used to describe how the regenerative braking currents arise, and FIG. 2 is a schematic circuit diagram of an embodiment of the invention.

Referring to FIG. 1 there is shown a series motor having an armature A and field F in series with a D.C. switch S across a battery B. A reverse diode D1 is connected across the armature and a second diode D2 across the series combination of the armature A and field F.

In the normal motoring condition the D.C. switch S is turned on, and current builds up, from the battery B, in the motor inductance. After some time the D.C. switch is turned off, and the energy stored in the motor inductance circulates through the flywheel diode D2. After about 10 cycles the rise and fall of current become equal and the motor current becomes a steady level with a ripple content of about 20 percent. The means motor voltage is thus on time/cycle time X battery voltage, and is varied to drive the motor at the right speed. The braking diode D1 plays no part in this operation because the armature and field currents are, at all times, the same.

When the field is reversed, the motor is used as a generator, and the diode D1 is used to separate the field and armature currents. The armature voltage is in such a sense that diode D1 is forward biased so that the armature current flows only around diode D1 and the armature A, while the field current is taken from the battery by the D.C. switch S. The diode D1 appears as a short circuit to the battery current, and during the field current pulses the diode current is the difference between the armature and field currents.

The resistance of the armature is low, so the generated armature voltage must be kept low, to prevent excessive armature currents. Hence the field current is low, achieved by pulsing the D.C. switch at a low rate. Some typical values will make the situation clearer:

Clearly, as the motor speed falls, its voltage will fall and the armature current will fall. By building up the field current slowly, a reasonably constant torque, represented by the product of armature current and field current, can be obtained as the speed falls.

The rate at which the vehicle momentum is destroyed is (armature current)$^2$ x resistance in armature circuit and the total work done in stopping the vehicle is the integral of this over the time taken for the vehicle to stop.

This means, then, that all the kinetic energy stored in the vehicle at the entry point is converted into heat losses in the armature and braking diode over the stopping period. From this it is very obviously for use only as a stopping brake. Typically, stopping an industrial truck from 6 m.p.h. in 3 – 5 seconds the heating effect is very small.

There are some applications, e.g. mining locomotives and road vehicles, where the electrical braking must be used as a holding brake.

In accordance with the invention, a resistor R is connected in series with the armature A, as shown in FIG. 2. A contactor C is provided having its current coil in series with diode D1 and having normally closed contacts C1 shorting resistor R.

In normal motoring conditions, the resistor R is short circuited by contacts C1. As soon as the motor begins to generate, current begins to flow through diode D1 and through the coil of contactor C, thus energising the contactor, opening contacts C1 and introducing resistor R into the armature diode loop.

Under these conditions the field current and generated voltage are higher than in the FIG. 1 arrangement and the armature current is less. This will retain the same torque but reduce the dissipation in the motor to a reasonable level.

The control circuit of the D.C. switch S automatically sets the pulse rate range by looking at the voltage sense of diode D1. If diode D1 is blocking the pulse rate runs at the full motoring rate. If diode D1 is conducting, the pulse rate is reduced to the braking rate. For example, a second set of contacts C2 may be arranged on contactor C and connected in the pulse generator circuit of DC switch S so that the pulse rate range is restricted when contactor C is energised. Thus, the only operation by the driver is to reverse the field contactors when braking is required.

The resistor R and shorting contacts C1 may be arranged in the diode D1 portion of the armature/diode loop.

What is claimed is:

1. A control means for a series electric motor comprising a DC switch connecting said motor across a battery, a flywheel diode across the motor and a reverse diode across the armature for conducting armature current resulting from regeneration, a resistor provided in the armature reverse-diode loop in combination with a contactor having a current coil sensitive only to reverse diode current and having normally closed contacts shorting the resistor.

2. A control means as claimed in claim 1, wherein the resistor is connected in the series connection of the motor between the armature and the field and the current coil of the contactor is connected in series with the reverse diode across the series connection of the resistor and the armature.

3. A control means as claimed in claim 1, wherein the resistor, the current coil of the contactor and the reverse diode are connected in series across the armature of the motor.

4. A control means as claimed in claim 1, wherein the D.C. switch provides pulses of current to the motor and means are provided to limit the range of pulse rate applied to the motor during conduction of the reverse diode.

5. A control means as claimed in claim 4, wherein said means for limiting the pulse rate range includes further contacts on said contactor, which further contacts limit the pulse rate range when the contactor is energised.

* * * * *